US012562644B2

(12) United States Patent
Liu

(10) Patent No.: US 12,562,644 B2
(45) Date of Patent: Feb. 24, 2026

(54) VOLTAGE STABILIZING CIRCUIT, VOLTAGE STABILIZING METHOD, CHARGING CIRCUIT, AND ELECTRONIC EQUIPMENT

(71) Applicant: TCL China Star Optoelectronics Technology Co., Ltd., Guangdong (CN)

(72) Inventor: Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 722 days.

(21) Appl. No.: 17/275,193

(22) PCT Filed: Dec. 31, 2020

(86) PCT No.: PCT/CN2020/142462
§ 371 (c)(1),
(2) Date: Sep. 6, 2023

(87) PCT Pub. No.: WO2022/141551
PCT Pub. Date: Jul. 7, 2022

(65) Prior Publication Data
US 2023/0421061 A1     Dec. 28, 2023

(30) Foreign Application Priority Data
Dec. 30, 2020   (CN) ......................... 202011606842.3

(51) Int. Cl.
H02M 3/158       (2006.01)
H02J 7/00        (2006.01)
H02M 1/00        (2007.01)

(52) U.S. Cl.
CPC ......... H02M 3/158 (2013.01); H02M 1/0022 (2021.05); H02J 7/007 (2013.01)

(58) Field of Classification Search
CPC ........ H02M 3/10; H02M 3/156; H02M 3/158; H02M 3/1588; H02M 3/1566;
(Continued)

(56) References Cited

U.S. PATENT DOCUMENTS 9,543,839 B2 * 1/2017 Jin ........................ H02M 3/158
10,468,978 B2 * 11/2019 Zhang ................... H02M 3/073
(Continued)

FOREIGN PATENT DOCUMENTS

CN       101111987       1/2008
CN       102005918       4/2011
(Continued)

*Primary Examiner* — Gustavo A Rosario-Benitez
(74) *Attorney, Agent, or Firm* — PV IP PC; Peter Stecher; Wei Te Chung

(57) ABSTRACT
The present disclosure provides a voltage stabilizing circuit, a voltage stabilizing method, a charging circuit, and an electronic equipment. In the present disclosure, the voltage stabilizing circuit is designed to include multiple operating modes, which prevents a structure of simultaneously setting a boost converter and a buck-boost converter, thereby improving voltage conversion efficiency and reducing cost.

7 Claims, 3 Drawing Sheets

(58) Field of Classification Search
CPC .... H02M 1/0016; H02M 1/0022; H02M 1/36;
H02M 1/0006; H02M 1/0096
See application file for complete search history.

(56) References Cited

U.S. PATENT DOCUMENTS

| | | | | |
|---|---|---|---|---|
| 2002/0145891 | A1* | 10/2002 | Ling | H02M 3/1588 |
| | | | | 363/59 |
| 2003/0178974 | A1* | 9/2003 | Rozsypal | H02M 3/1582 |
| | | | | 323/224 |
| 2004/0095081 | A1 | 5/2004 | Kernahan | |
| 2004/0252532 | A1* | 12/2004 | Lee | H02M 3/156 |
| | | | | 363/89 |
| 2010/0007999 | A1* | 1/2010 | Iwata | H02M 3/1588 |
| | | | | 361/18 |
| 2010/0194366 | A1* | 8/2010 | Serdarevic | H02M 3/1588 |
| | | | | 323/283 |
| 2011/0006745 | A1* | 1/2011 | Saphon | H02M 3/156 |
| | | | | 323/282 |
| 2013/0241503 | A1 | 9/2013 | Galinski, III | |
| 2013/0307467 | A1* | 11/2013 | Carletti | H02J 7/02 |
| | | | | 323/282 |
| 2015/0137777 | A1* | 5/2015 | Chen | H02M 3/1588 |
| | | | | 323/271 |
| 2017/0243530 | A1* | 8/2017 | Kwon | H02M 3/158 |
| 2020/0212800 | A1* | 7/2020 | Fan | H02M 3/158 |
| 2022/0091625 | A1* | 3/2022 | Luo | H02M 1/32 |

FOREIGN PATENT DOCUMENTS

| | | |
|---|---|---|
| CN | 103501112 | 1/2014 |
| CN | 105226947 | 1/2016 |
| CN | 207765993 | 8/2018 |
| CN | 209419483 | 9/2019 |
| CN | 112135394 | 12/2020 |
| EP | 2493060 | 8/2012 |

* cited by examiner

VOLTAGE STABILIZING CIRCUIT, VOLTAGE STABILIZING METHOD, CHARGING CIRCUIT, AND ELECTRONIC EQUIPMENT

RELATED APPLICATIONS

This application is a National Phase of PCT Patent Application No. PCT/CN2020/142462 having International filing date of Dec. 31, 2020, which claims the benefit of priority of Chinese Patent Application No. 202011606842.3 filed on Dec. 30, 2020. The contents of the above applications are all incorporated by reference as if fully set forth herein in their entirety.

FIELD AND BACKGROUND OF THE INVENTION

The present disclosure relates to the technical field of digital switching power, in particular to a voltage stabilizing circuit, a voltage stabilizing method, a charging circuit, and an electronic equipment.

With rapid development of electronic technology, central processing units (CPUs) have become more and more widely used. In order to reduce losses, a power with low-voltage and high-current is usually selected as a power supply. A power supply for special loads is called a voltage regulator module (VRM), i.e., a voltage regulating module, which is commonly known as a charging circuit of a charger.

As shown in FIG. 1, in an existing charging circuit for a small-size display screen (such as a mobile phone screen), a voltage Vcharge in a charging circuit 90 is an external charging voltage, and a buck converter 91 is provided to supply power to a display screen 92 and to charge batteries. The buck converter 91 is simply a type of voltage conversion circuit, in which an output voltage is lower than an input voltage. A boost converter 93 is also a type of voltage conversion circuit, in which the output voltage is higher than the input voltage. During charging, in order to charge quickly, a charging voltage is increased to improve a charging current. At this time, a battery voltage VBAT will increase to 4.9V. Since an output voltage VDD, which is equal to 4.6V, is less than an input voltage VBAT, which is equal to 4.9V, the boost converter 93 cannot use a synchronous boost converter with high conversion efficiency. A buck-boost converter 94 is added to ensure voltage difference between two ends of the display screen 92. The disadvantage is that the conversion efficiency is low and cost is high. The buck-boost converter 94 is a type of voltage conversion circuit, in which an absolute value of an output voltage can be higher than an input voltage or lower than the input voltage, and a polarity of the output voltage is opposite to the polarity of the input voltage. It can be seen that the voltage conversion efficiency of the existing charging circuit 90 is low, and the buck-boost converter 94 needs to be provided, which increases the cost.

SUMMARY OF THE INVENTION

A purpose of the present disclosure is to provide a voltage stabilizing circuit, stabilizing method, a charging circuit, and an electronic equipment, in order to solve technical problems in an existing stabilizing circuit, such as a lower voltage conversion efficiency, and a higher cost caused by an additional buck-boost converter.

In order to achieve the above purpose, the present disclosure provides a voltage stabilizing circuit, comprising:

A voltage regulating module, wherein an input terminal of the voltage regulating module receives an input voltage VBAT, and an output terminal of the voltage regulating module outputs a required voltage VDD; and A driving controller, wherein an input terminal of the driving controller receives the input voltage VBAT, and an output terminal of the driving controller electrically connects to the voltage regulating module, Wherein the driving controller is configured to determine whether or not the input voltage VBAT is less than or equal to a first preset voltage Un, If so, the driving controller controls the voltage regulating module to increase the input voltage VBAT to the required voltage VDD directly and output the required voltage VDD;

If not, the driving controller determines whether the input voltage VBAT is less than a second preset voltage Um or equal to the second preset voltage Um, and if the input voltage VBAT is less than the second preset voltage Um, the driving controller controls the voltage regulating module to increase the input voltage VBAT to the second preset voltage Um, then decrease the increased input voltage VBAT to the required voltage VDD and output the required voltage VDD, Wherein the first preset voltage Un is less than the required voltage VDD, and the required voltage VDD is less than the second preset voltage Um.

In addition, the voltage regulating module comprises:

An inductance coil, wherein an input terminal of the inductance coil receives the input voltage VBAT, and the inductance coil is configured to increase the input voltage VBAT.

In addition, wherein the voltage regulating module further comprises an n-channel metal oxide semiconductor (MOS) transistor comprising a source, a drain and a gate, wherein the drain of the n-channel MOS transistor electrically connects to an output terminal of the inductance coil, the source of the n-channel MOS transistor is configured to output the required voltage VDD, and the gate of the n-channel MOS transistor electrically connects to an output terminal of the driving controller, Wherein when the input voltage VBAT is less than or equal to the first preset voltage Un, the n-channel MOS transistor turns on, and when the input voltage VBAT is greater than the first preset voltage Un and less than the second reset voltage Um, the n-channel MOS transistor turns off.

In addition, the voltage regulating module further comprises a p-channel MOS transistor and a capacitor, wherein the p-channel MOS transistor comprises a source, a drain and a gate, the source of the p-channel MOS transistor electrically connects to the output terminal of the inductance coil, the drain of the p-channel MOS transistor electrically connects to an end of the capacitor, the gate of the p-channel MOS transistor electrically connects to another output terminal of the driving controller, and another end of the capacitor electrically connects to the drain of the n-channel MOS transistor, Wherein when the input voltage VBAT is greater than the first preset voltage Un and less than the second reset voltage Um, the p-channel MOS transistor turns on, and when the input voltage VBAT is equal to the second preset voltage Um, and the p-channel MOS transistor turns off.

In addition, the voltage regulating module further comprises a parasitic diode, a positive pole of the parasitic diode electrically connects to the drain of the n-channel MOS transistor, and a negative pole of the parasitic diode electrically connects to the source of the n-channel MOS transistor, wherein when the input voltage VBAT is equal to the second preset voltage Um, the parasitic diode in the n-channel MOS transistor turns on under the action of the second preset voltage Um.

In addition, the voltage stabilizing circuit further comprises one or more of an error amplifier, a loop filter, and a pulse width modulator connected in series between the required voltage VDD and the driving controller.

The present disclosure further provides a voltage stabilizing method of the voltage stabilizing circuit above, comprising:

Acquiring the input voltage VBAT;

Determining whether or not the input voltage VBAT is less than or equal to the first preset voltage Un, wherein the first preset voltage Un is less than the required voltage VDD;

If so, controlling the voltage regulating module to increase the input voltage VBAT to the required voltage VDD directly and output the required voltage VDD;

If not, determining whether the input voltage VBAT is less than the second preset voltage Um or equal to the second preset voltage Um, and the required voltage VDD being less than the second preset voltage Um, wherein if the input voltage VBAT is less than the second preset voltage Um, the voltage regulating module is controlled to increase the input voltage VBAT to the second preset voltage Um, then decrease the input voltage VBAT increased to the required voltage VDD, and output the required voltage VDD, and if input voltage VBAT is equal to the second preset voltage Um, the voltage regulating module is controlled to decrease the input voltage VBAT to the required voltage VDD directly and output the required voltage VDD.

The preset disclosure further comprises a charging circuit, comprising the voltage stabilizing circuit above.

The present disclosure further comprises an electronic equipment, comprising the charging circuit above or the voltage stabilizing circuit above.

Beneficial effect of the present disclosure: in the present disclosure, a voltage stabilizing circuit, a voltage stabilizing method, a charging circuit, and an electronic equipment are provided. A voltage stabilizing circuit with multiple operating modes is designed, and it prevents a structure of setting a boost converter and a buck converter simultaneously, thereby improving the voltage conversion efficiency and reducing the cost.

BRIEF DESCRIPTION OF THE SEVERAL VIEWS OF THE DRAWINGS

Technical solutions and beneficial effect of the present disclosure will be obvious through the following detailed description of embodiments of the present disclosure in conjunction with the accompanying drawings

Figure 1:
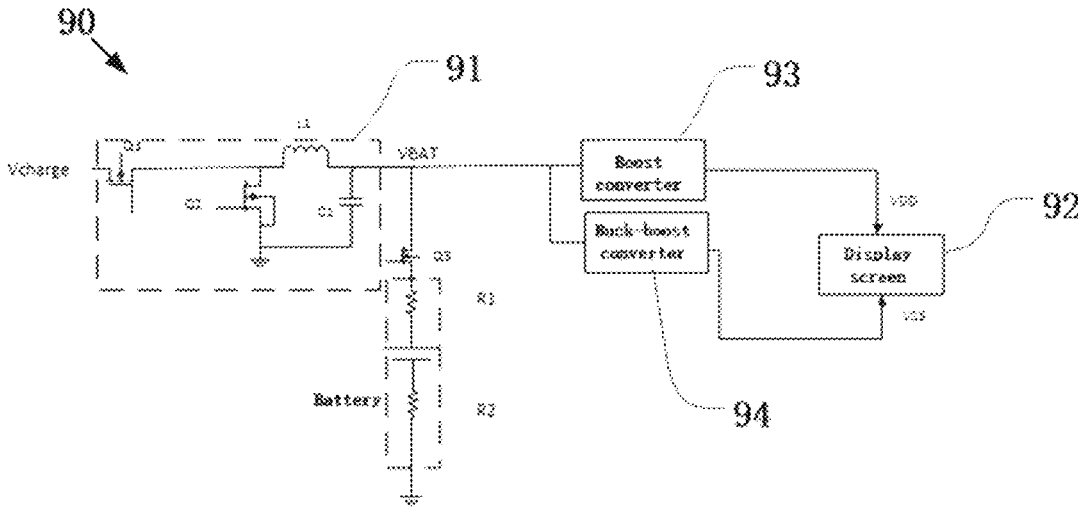
FIG. 1 is a schematic structural diagram of an existing charging circuit.

Elements in the drawings are identified as follows:

Voltage stabilizing circuit 100,

Voltage regulating module 10, voltage regulator 11, driving controller 20,

Error amplifier 30, loop filter 40, pulse width modulator 50,

Charging circuit 90 and 200,

Buck converter 91 and 210, display screen 92, boost converter 93,

Buck-boost converter 94, battery 220

DESCRIPTION OF SPECIFIC EMBODIMENTS OF THE INVENTION

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "multiple" means at least two, such as two, three, etc., unless otherwise specifically defined.

Figure 2:
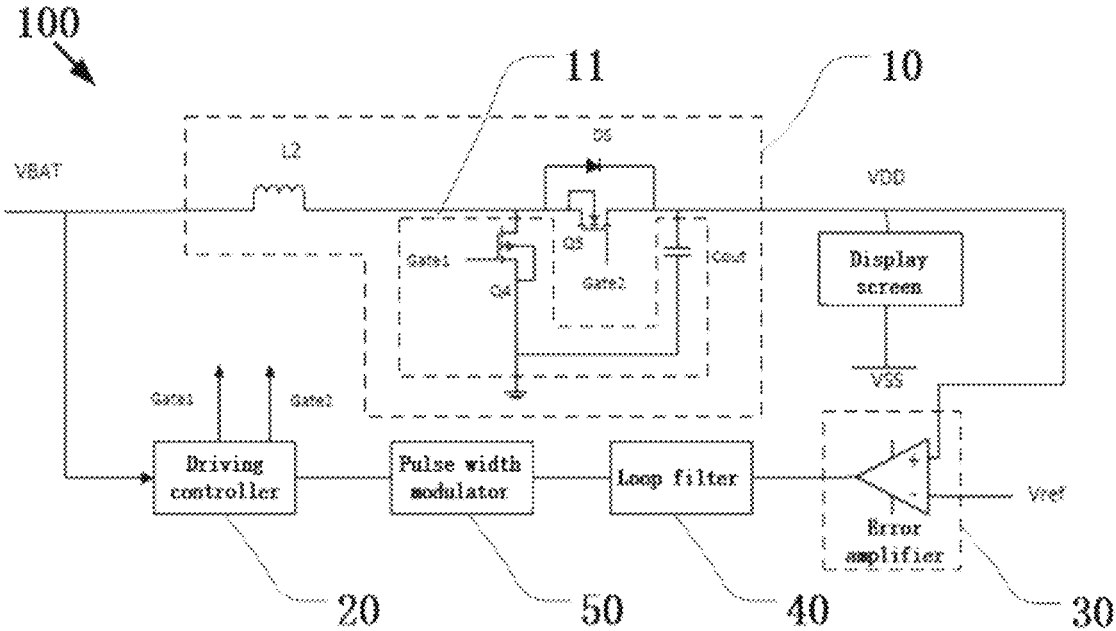
FIG. 2 is a schematic structural diagram of a voltage stabilizing circuit in an embodiment of the present disclosure.

Please refer to FIG. 2, the present disclosure provides a voltage stabilizing circuit 100 configured to receive an input voltage VBAT and continuously output a stable required voltage VDD. The voltage stabilizing circuit 100 comprises a voltage regulating module 10 and a driving controller 20, wherein an input terminal of the voltage regulating module 10 receives the input voltage VBAT and an output terminal of the voltage regulating mode 10 outputs the required voltage VDD, and an input terminal of the driving controller 20 receives the input voltage VBAT and an output terminal of the driving controller 20 is connected to the voltage regulating module 10. The driving controller 20 is configured to determine whether or not the input voltage VBAT is less than or equal to a first preset voltage Un, and if so, it controls the voltage regulating module 10 to directly increase the input voltage VBAT to the required voltage VDD and output the same; if not, it determines whether or not the input voltage VBAT is less than or equal to a second preset voltage Um. If the input voltage VBAT is less than the second preset voltage Um, the driving controller 20 controls the voltage regulating module 10 to increase the input voltage VBAT to the second preset voltage Um and then decrease the input voltage VBAT increased to the required voltage VDD and output the same. If the input voltage VBAT is equal to the second preset voltage Um, the driving controller 20 controls the voltage regulating module 10 to directly decrease the input voltage VBAT to the required voltage VDD and output the same. Wherein, the first preset voltage Un is less than the required voltage VDD, and the required voltage VDD is less than the second preset voltage Um.

It can be understood that, the voltage stabilizing circuit 100 comprises a first operating mode and a second operating mode. The voltage stabilizing circuit 100 is configured to determine a range of the input voltage VBAT to perform the first operating mode or the second operating mode. When VBAT≤Un, the voltage stabilizing circuit 100 enters the first operating mode and increases the input voltage VBAT to the required voltage VDD. When Un<VBAT, the voltage stabilizing circuit 100 enters the second operating mode, and increases and then decrease the input voltage VBAT to the required voltage VDD.

In this embodiment, the second operating mode comprises a voltage regulating mode and a power supply mode. When Un<VBAT<Um, the voltage stabilizing circuit 100 enters the voltage regulating mode and increases the input voltage VBAT to the voltage Um, wherein the voltage Um is a maximum voltage value of the input voltage VBAT. When VBAT=Um, the stabilizing circuit 100 enters the power supply mode, the input voltage VBAT increase to the voltage Um and a parasitic diode DS is turned on to output the required voltage VDD under the action of the voltage Um. A turn-on voltage of the parasitic diode DS is a voltage Ur, wherein Um−Ur=VDD.

It can be simply understood that, when the input voltage VBAT is less than or equal to the first preset voltage Un, it enters the first operating mode, and an n-channel metal oxide semiconductor field effect transistor (n-channel MOS transistor) turns on. When the input voltage VBAT is greater than the first preset voltage Un and less than the second preset voltage Um, it enters the voltage regulating mode of the second operating mode, and the n-channel MOS transistor turns off. When the input voltage VBAT is equal to the second preset voltage Um, it enters the power supply mode of the second operating mode, and the parasitic diode in the n-channel MOS transistor turns on under the action of the voltage Um.

It should be noted that, in this embodiment, the input voltage VBAT ranges from 2.9V to 4.9V, and the required voltage VDD is 4.6V, wherein the voltage Un for judgement is 4.4V, the parasitic diode DS is a germanium diode and the turn-on voltage Ur thereof is 0.3V, the maximum voltage value Um of the input voltage VBAT is 4.9V, and thus the voltage VDD stabilizes at 4.9−0.3=4.6V.

In this embodiment, the voltage regulating module 10 is composed of an inductance coil L2 and a parallel connection of an n-channel MOS transistor Q5 and a voltage regulator 11 in series connection. An input terminal of the inductance coil L2 receives the input voltage VBAT, and the inductance coil L2 can be configured to boost the input voltage VBAT. The n-channel MOS transistor Q5 comprises a source, a drain, and a gate, wherein the drain electrically connects to an output terminal of the inductance coil L2, the source is used to output the required voltage VDD, and the gate electrically connects to an output terminal of the driving controller 20. In addition, the n-channel MOS transistor Q5 comprises the parasitic diode DS. A positive pole of the parasitic diode DS electrically connects to the drain of the n-channel MOS transistor Q5, and a negative pole of the parasitic diode DS electrically connects to the source of the n-channel MOS transistor. When the voltage stabilizing circuit 100 enters the voltage regulating mode, the n-channel MOS transistor Q5 turns off. At this time, the inductance coil L2 is charged and boosts the n-channel MOS transistor Q5 by the same operating principle with a general synchronous boost circuit. When the stabilizing circuit 100 enter s the power supply mode, the n-channel MOS transistor Q5 turns on the parasitic diode DS under the action of the voltage Um.

In this embodiment, the voltage regulator 11 is composed of a series connection of a p-channel MOS transistor Q4 and a capacitor Cout. The p-channel MOS transistor Q4 comprises a source, a drain, and a gate. Wherein the source electrically connects to the output terminal of the inductance coil L2, the drain electrically connects to an end of the capacitor Cout, the gate electrically connects to another end of the driving controller 20, and another end of the capacitor Cout electrically connects to the drain of the n-channel MOS transistor Q5. When the voltage stabilizing circuit 100 enters the voltage regulating mode, the p-channel MOS transistor Q4 turns on, and when the voltage stabilizing circuit 100 enters the power supply mode, the p-channel MOS transistor Q4 turns off.

In this embodiment, the driving controller 20 comprises a controller input terminal, a controller output terminal, a first gate signal output terminal Gate1, and a second gate signal output terminal Gate2. The controller input terminal connects to the input voltage VBAT, the controller output terminal connects to the required voltage VDD, the first gate signal output terminal Gate1 connects to the gate of the p-channel MOS transistor Q4, and the second gate signal output terminal Gate2 connects to the gate of the n-channel MOS transistor Q5. When the voltage stabilizing circuit 100 enters the first operating mode, the driving controller 20 outputs a high-level signal to the first gate signal output terminal Gate1 and the second gate signal output terminal Gate2, the p-channel MOS transistor Q4 turns off, and the n-channel MOS transistor Q5 turns on, wherein the n-channel MOS transistor Q5 turning on means that the part of the parasitic diode DS turns on under the control of the gate. When the voltage stabilizing circuit 100 enters the voltage regulating mode of the second operating mode, the driving controller 20 outputs a low-level signal to the first gate signal output terminal Gate1 and the second gate signal output terminal Gate2, the p-channel MOS transistor Q4 turns on and the n-channel MOS transistor Q5 turns off. When the voltage stabilizing circuit 100 enters the power supply mode of the second operating mode, the driving controller 20 outputs a high-level signal to the first gate signal output terminal Gate1 and a low-level signal to the second gate signal output terminal Gate2, the p-channel MOS transistor Q4 turns off, the n-channel MOS transistor Q5 turns off, and the parasitic diode DS turns on. At this time, a boost circuit formed of the inductance coil L2 and the p-channel MOS transistor Q4 does not need to operate, and the parasitic diode DS turns on and maintains the required voltage VDD at 4.6V. Wherein, the n-channel MOS transistor Q5 turning off means that the part except for the parasitic diode DS turns off under the control of the gate.

In this embodiment, the voltage stabilizing circuit 100 further comprises one or more of an error amplifier 30, a loop filter 40, and a pulse width modulator 50 connected in series between the required voltage VDD and the controller output terminal.

The error amplifier 30 comprises a sampled output voltage with a reference voltage and generate an error amplification signal to control a duty ratio of a pulse, thereby stabilizing the output voltage. The loop filter 400 is configured to attenuate a high-frequency error component to improve anti-interference performance. The pulse width modulator 50 is configured to control a variation of a duty ratio of a square wave and adjust outputs.

Specifically, a positive pole of the error amplifier 30 connects to the required voltage VDD, and a negative pole of the error amplifier 30 connects to a reference voltage Vref.

According to the voltage stabilizing circuit 100 for receiving the input voltage VBAT and outputting the stable required voltage VDD, the present disclosure further provides a voltage stabilizing method. The voltage stabilizing method comprises a first operating mode step and a second operating mode step. The voltage stabilizing circuit is configured to determine a range of the input voltage VBAT to perform the first operating mode step or the second operating mode step. When the input voltage VBAT is less than or equal to the first preset voltage Un, the first operating mode step is performed, and the voltage stabilizing circuit directly increases the input voltage VBAT to the required voltage VDD. When the input voltage VBAT is greater than the first preset voltage VBAT and less than the second preset voltage Um, the second operating mode step is performed, and the voltage stabilizing circuit increases the input voltage VBAT to the second preset voltage Um and then controls the voltage regulating module 10 to decrease the increased input voltage VBAT to the required voltage VDD. Wherein, the first preset voltage Un is less than the required voltage VDD, and the required voltage VDD is less than the second preset voltage Um.

In this embodiment, the voltage stabilizing method further comprises a third operating mode step. When the input voltage VBAT is equal to the second preset voltage Um, the third operating mode step is performed, and the voltage stabilizing circuit decreases the input voltage VBAT to the required voltage VDD directly.

In other words, the voltage stabilizing method of the voltage stabilizing circuit comprises: acquiring the input voltage VBAT; determining whether or not the input voltage VBAT is less than or equal to the first preset voltage Un, and the first preset voltage Un being less than the required voltage VDD; if so, controlling the voltage regulating module to increase the input voltage VBAT to the required voltage VDD and output the same; if not, determining whether the input voltage VBAT is less than the second preset voltage Um or equal to the second preset voltage Um, and the required voltage VDD being less than the second preset voltage Um; if the input voltage VBAT being less than the second preset voltage Um, controlling the voltage regulating module to increase the input voltage VBAT to the second preset voltage UM and then decrease the increased input voltage VBAT to the required voltage and output the same; if the input voltage VBAT being equal to the second preset voltage Um, controlling the voltage stabilizing module to decrease the input voltage VBAT to the required voltage VDD directly and output the same.

Figure 3:
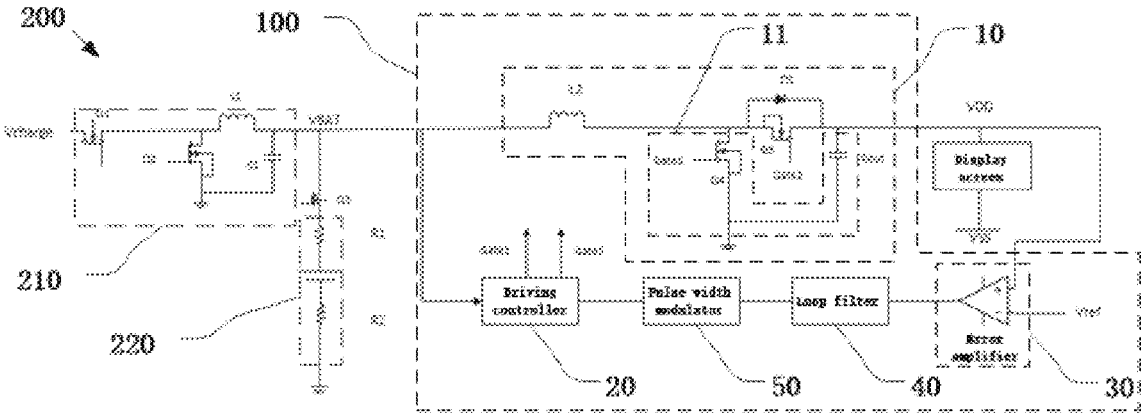
FIG. 3 is a schematic structural diagram of a charging circuit in an embodiment of the present disclosure.
Figure 4:
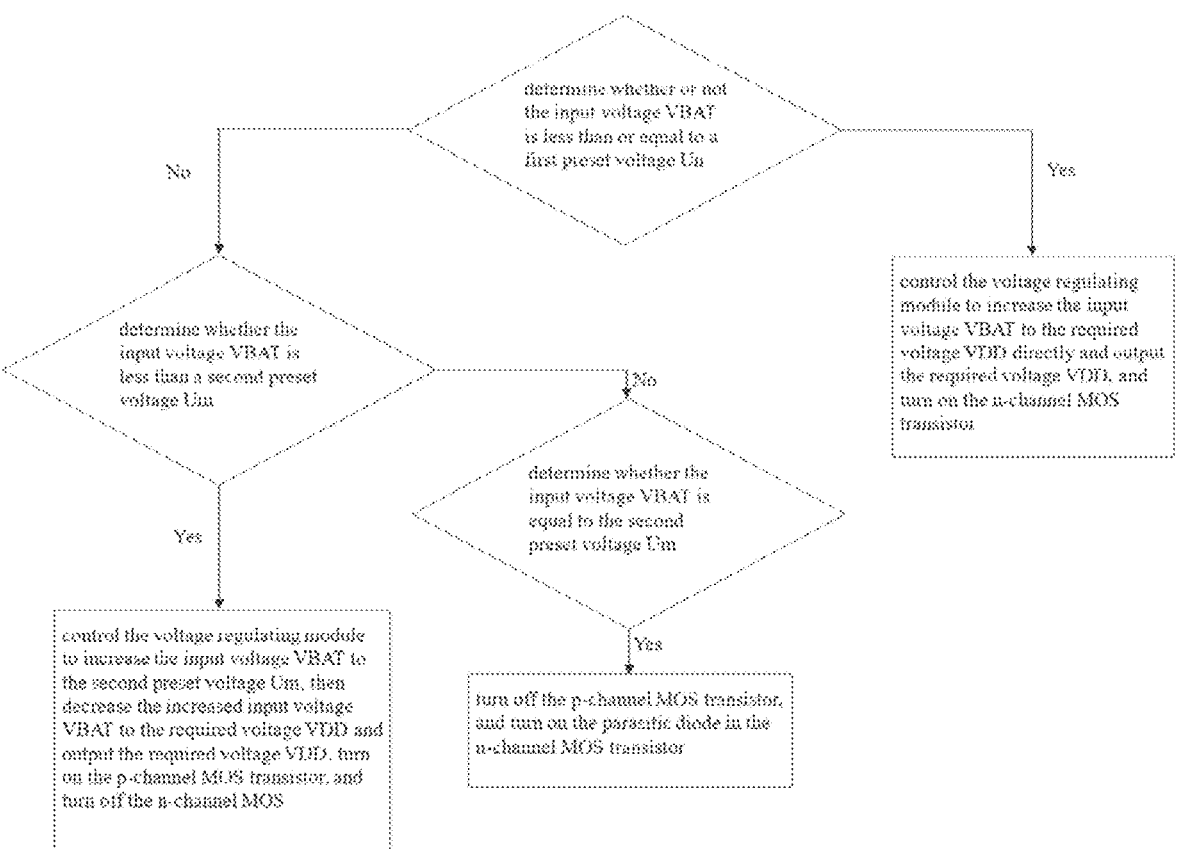
FIG. 4 shows operations of a driving controller in an embodiment of the present disclosure.

As shown in FIG. 3, the present disclosure further comprises a charging circuit 200, which comprises the voltage stabilizing circuit 100 described above. It can be understood that, the charging circuit 200 may further comprise a buck converter 210 and a battery 220 disposed at the front end of the voltage stabilizing circuit 100.

The present disclosure further provides an electronic equipment, which comprises the charging circuit 200 described above or the voltage stabilizing circuit 100 described above. The electronic equipment is provided with a display screen, and the voltage stabilizing circuit 100 is configured to provide the required voltage VDD to the display screen of the electronic equipment. A positive pole of the display screen of the electronic equipment connects to the required voltage VDD and a negative pole thereof connects to a ground voltage VSS.

Beneficial effect of the present disclosure: the present disclosure provides a voltage stabilizing circuit, a voltage stabilizing method, a charging circuit, and an electronic equipment. The voltage stabilizing circuit is designed to contain a first operating mode and a second operating mode, which prevents a structure simultaneously setting a boost converter and a buck-boost converter, thereby improving voltage conversion efficiency and reducing the cost.

The voltage stabilizing circuit, the voltage stabilizing method, the charging circuit and the electronic equipment provided in the embodiments of the present disclosure are described in detail above. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A voltage stabilizing circuit, comprising:
   a voltage regulating module, wherein an input terminal of the voltage regulating module receives an input voltage VBAT, and an output terminal of the voltage regulating module outputs a required voltage VDD; and
   a driving controller, wherein an input terminal of the driving controller receives the input voltage VBAT, and an output terminal of the driving controller electrically connects to the voltage regulating module,
   wherein the driving controller is configured to determine whether or not the input voltage VBAT is less than or equal to a first preset voltage Un,
   if so, the driving controller controls the voltage regulating module to increase the input voltage VBAT to the required voltage VDD directly and output the required voltage VDD;
   if not, the driving controller determines whether the input voltage VBAT is less than a second preset voltage Um or equal to the second preset voltage Um, and if the input voltage VBAT is less than the second preset voltage Um, the driving controller controls the voltage regulating module to increase the input voltage VBAT to the second preset voltage Um, then decrease the increased input voltage VBAT to the required voltage VDD and output the required voltage VDD,
   wherein the first preset voltage Un is less than the required voltage VDD, and the required voltage VDD is less than the second preset voltage Um;
   wherein the voltage regulating module comprises:
   an inductance coil, wherein an input terminal of the inductance coil receives the input voltage VBAT, and the inductance coil is configured to increase the input voltage VBAT;
   a n-channel metal oxide semiconductor (MOS) transistor comprising a source, a drain and a gate, wherein the drain of the n-channel MOS transistor electrically connects to an output terminal of the inductance coil, the source of the n-channel MOS transistor is configured to output the required voltage VDD, and the gate of the n-channel MOS transistor electrically connects to the output terminal of the driving controller; and a parasitic diode, wherein a positive pole of the parasitic diode electrically connects to the drain of the n-channel MOS transistor, and a negative pole of the parasitic diode electrically connects to the source of the n-channel MOS transistor;

wherein when the input voltage VBAT is less than or equal to the first preset voltage Un, the n-channel MOS transistor turns on, and when the input voltage VBAT is greater than the first preset voltage Un and less than the second preset voltage Um, the n-channel MOS transistor turns off;

when the input voltage VBAT is equal to the second preset voltage Um, the parasitic diode in the n-channel MOS transistor turns on under the action of the second preset voltage Um.

2. The voltage stabilizing circuit of claim 1, wherein the voltage regulating module further comprises a p-channel MOS transistor and a capacitor, wherein the p-channel MOS transistor comprises a source, a drain and a gate, the source of the p-channel MOS transistor electrically connects to the output terminal of the inductance coil, the drain of the p-channel MOS transistor electrically connects to an end of the capacitor, the gate of the p-channel MOS transistor electrically connects to another output terminal of the driving controller, and another end of the capacitor electrically connects to the drain of the n-channel MOS transistor, wherein when the input voltage VBAT is greater than the first preset voltage Un and less than the second preset voltage Um, the p-channel MOS transistor turns on, and when the input voltage VBAT is equal to the second preset voltage Um, and the p-channel MOS transistor turns off.

3. The voltage stabilizing circuit of claim 1, wherein the voltage stabilizing circuit further comprises one or more of an error amplifier, a loop filter and pulse width modulator connected in series between the required voltage VDD and the driving controller.

4. A charging circuit, comprising the voltage stabilizing circuit of claim 1.

5. An electronic equipment, comprising the charging circuit of claim 4.

6. An electronic equipment, comprising the voltage stabilizing circuit of claim 1.

7. A voltage stabilizing method of a voltage stabilizing circuit, comprising:

a voltage regulating module, wherein an input terminal of the voltage regulating module receives an input voltage VBAT, and an output terminal of the voltage regulating module outputs a required voltage VDD; and a driving controller, wherein an input terminal of the driving controller receives the input voltage VBAT, and an output terminal of the driving controller electrically connects to the voltage regulating module, wherein the voltage regulating module comprises:

an inductance coil, wherein an input terminal of the inductance coil receives the input voltage VBAT, and the inductance coil is configured to increase the input voltage VBAT;

a n-channel metal oxide semiconductor (MOS) transistor comprising a source, a drain and a gate, wherein the drain of the n-channel MOS transistor electrically connects to an output terminal of the inductance coil, the source of the n-channel MOS transistor is configured to output the required voltage VDD, and the gate of the n-channel MOS transistor electrically connects to an output terminal of the driving controller; and a parasitic diode, wherein a positive pole of the parasitic diode electrically connects to the drain of the n-channel MOS transistor, and a negative pole of the parasitic diode electrically connects to the source of the n-channel MOS transistor;

wherein the method comprises:

acquiring, by the voltage regulating module, the input voltage VBAT;

determining, by the driving controller, whether or not the input voltage VBAT is less than or equal to the first preset voltage Un, wherein the first preset voltage Un is less than the required voltage VDD;

if so, controlling the voltage regulating module to increase the input voltage VBAT to the required voltage VDD directly and output the required voltage VDD;

if not, determining whether the input voltage VBAT is less than the second preset voltage Um or equal to the second preset voltage Um, and the required voltage VDD being less than the second preset voltage Um, wherein if the input voltage VBAT is less than the second preset voltage Um, the voltage regulating module is controlled to increase the input voltage VBAT to the second preset voltage Um, then decrease the input voltage VBAT increased to the required voltage VDD, and output the required voltage VDD, and if input voltage VBAT is equal to the second preset voltage Um, the voltage regulating module is controlled to decrease the input voltage VBAT to the required voltage VDD directly and output the required voltage VDD;

wherein when the input voltage VBAT is less than or equal to the first preset voltage Un, the n-channel MOS transistor turns on, and when the input voltage VBAT is greater than the first preset voltage Un and less than the second preset voltage Um, the n-channel MOS transistor turns off;

when the input voltage VBAT is equal to the second preset voltage Um, the parasitic diode in the n-channel MOS transistor turns on under the action of the second preset voltage Um.

* * * * *